(12) United States Patent
Subbloie et al.

(10) Patent No.: US 12,399,489 B2
(45) Date of Patent: Aug. 26, 2025

(54) DYNAMIC REAL TIME AVERAGE MONTHLY ENERGY MANAGEMENT SYSTEM

(71) Applicant: Budderfly, Inc., Shelton, CT (US)

(72) Inventors: Albert Subbloie, Orange, CT (US); Paul Schmidt, Rocky Hill, CT (US)

(73) Assignee: Budderfly, Inc., Shelton, CT (US)

( * ) Notice: Subject to any disclaimer, the term of this patent is extended or adjusted under 35 U.S.C. 154(b) by 0 days.

(21) Appl. No.: 18/326,625

(22) Filed: May 31, 2023

(65) Prior Publication Data

US 2023/0418276 A1 Dec. 28, 2023

Related U.S. Application Data

(60) Provisional application No. 63/355,349, filed on Jun. 24, 2022.

(51) Int. Cl.
G05B 23/02 (2006.01)

(52) U.S. Cl.
CPC ....... *G05B 23/024* (2013.01); *G05B 23/0281* (2013.01)

(58) Field of Classification Search
CPC .......................... G05B 23/024; G05B 23/0281
See application file for complete search history.

(56) References Cited

U.S. PATENT DOCUMENTS

| | | | |
|---|---|---|---|
| 6,216,956 B1* | 4/2001 | Ehlers | F24F 11/62 236/47 |
| 6,782,345 B1* | 8/2004 | Siegel | G06F 11/0748 714/E11.026 |
| 10,748,497 B2* | 8/2020 | Hosoumi | G06F 3/0446 |
| 10,810,620 B2* | 10/2020 | Malik | H04W 4/024 |
| 10,810,690 B2 | 10/2020 | Subbloie et al. | |
| 10,916,968 B2 | 2/2021 | Subbloie | |
| 2019/0241192 A1* | 8/2019 | Matthews | B60W 50/0097 |
| 2020/0170516 A1* | 6/2020 | Ayers | A61B 5/0205 |
| 2021/0064528 A1* | 3/2021 | Ishii | G06F 12/0875 |
| 2021/0097565 A1* | 4/2021 | Subbloie | G06Q 30/0226 |
| 2022/0091601 A1* | 3/2022 | Grau Unda | G05B 23/0224 |

OTHER PUBLICATIONS

Schwartzberg, Eric, "Miamisburg aims to create outdoor drinking area in city's downtown," TCA Regional News, Chicago, Mar. 19, 2021.*
Tawalbeh, Nabeel, and El-Khazali, Reyad, "Peak Load Evaluation Based on the Accumulated Annual Energy," 2012 16th IEEE Mediterranean Electrotechnical Conference, Yasmine Hammamet, Tunisia, 2012, pp. 544-547.*

* cited by examiner

*Primary Examiner* — Nathan Erb
(74) *Attorney, Agent, or Firm* — Farber LLC

(57) ABSTRACT

A system and method of dynamically calculating average monthly energy use through a system of weights attributed to business, environmental, and operational variables. The system applies machine learning to improve upon its estimations by learning the correlations of equipment and operational factors to the overall equipment use.

19 Claims, 6 Drawing Sheets

400 — Site 1

Equipment List (410)

| Equipment | Expected Avg Use | Actual Use |
|---|---|---|
| HVAC Model/Age | 2,000 KwH/M | 2,200KwH/M |
| Freezer Model/Age | 20 KwH/M | 21KwH/M |
| Hot Water Model/Age | 10KwH/M | 18 KwH/M |
| Fridge Model/Age | 10KwH/M | 6 KwH/M |
| Ice Maker Model/Age | 5 KwH/M | 3 KwH/M |
| Cook Top Model/Age | 40 KwH/M | 55 KwH/M |
| Bread Oven Model/Age | 100 KwH/M | 140 KwH/M |

Site Information (430)

| Temperature Zone | North East |
|---|---|
| Size | 2,000 SQ Ft |
| Number exposed walls | 4 |
| Exposed Roof | Yes |
| Walk in Freezer | Yes |
| HVAC compressor rooftop | Yes |
| Opening Hours | 24/7 |
| Solarium | No |

External Variables and Impact Measured/Expected (420)

| External Variable | Impacted Equipment | Expected Impact | Actual Impact |
|---|---|---|---|
| External Temp | HVAC | .1%/degree over room setting | .3% |
| | Hot Water | .05%/degree over room setting | .01% |
| Freezer Door Opening | Freezer | .1%/minute | .05% |
| Humidity | HVAC | 1%/percent over 50% | .2% |
| Sunlight | HVAC | -1%/peak daylight | -1% |
| Business Volume | Bread Oven | 1%/100$ change | 1.1% |
| | Cook Top | 1%/100$ change | 1.4% |
| | Ice Maker | 2%/100$ change | 1.2% |
| | Hot Water | .25%/100$ change | 0.1% |
| Menu Selection Based (per menu item) | Bread oven | .01%/item 1 | .01% |
| | Cook Top | .01%/item 1 | .01% |

FIG. 4

DYNAMIC REAL TIME AVERAGE MONTHLY ENERGY MANAGEMENT SYSTEM

FIELD OF THE INVENTION

The present disclosure relates to systems and methods for dynamically monitoring and controlling energy usage, as well as determining expected energy usage for a facility. Predictive analysis utilizes machine learning to account for a multitude of variables including, dynamically changing environmental data, business fluctuations, operational adjustments, and the equipment used at the facility.

BACKGROUND OF THE INVENTION

Monitoring energy use has become standard for many companies, which use this data to make decisions on how to lower energy costs. As companies become more socially conscious, this data is also used to determine how a company can transition to a "greener" operation that lowers the impact the company's operations have on the environment. Additionally, as energy costs have begun to fluctuate widely in recent years, the ability to accurately predict energy usage and therefore cost, has become increasingly difficult to budget for.

Often the programs put in place to lower energy usage are implemented by a third-party vendor that generates revenue based on the savings achieved due to the steps taken by the third-party vendor. Often these steps involve an analysis of the facility and the equipment used at the facility along with a recommendation to upgrade some or all the equipment serving the facility. For example, this could include recommending upgrading older HVAC equipment with newer more efficient equipment or recommending the replacement of older lighting with newer more energy efficient lighting for the facility and so on. These third-party vendors may provide financing for the new equipment and in some instances, may even include monitoring of the new equipment that was installed to determine actual savings the new equipment provides versus the older less efficient equipment.

One system is disclosed in U.S. Pat. No. 10,810,690 (the '690 patent) entitled "Facility Energy Management", which teaches how to determine an Average Monthly Usage (AMU). This patent focuses on how to use knowledge of the equipment that is being used at a facility to replace/upgrade equipment that is aging and is increasingly becoming degraded. While this system taught in the '690 patent is effective at reducing energy costs associated with equipment that is degrading, the '690 patent utilizes a fixed AMU. A fixed AMU is not dynamic and as such, does not account for dynamic changes in uses at a particular facility or dynamic changes in energy costs.

Another system is disclosed in U.S. Pat. No. 10,916,968 (the '968 patent) entitled, "Third Party Energy Management", which teaches a method of controlling a customer's energy bill. In particular, the '968 patent describes how a company can take over or assume responsibility for paying the energy bill for a client while simultaneously pre-billing the client for the energy that will be used during a billing period based on a calculated energy usage for the pre-billed billing period. Active control of the customer's equipment assists the company to maintain the energy usage within acceptable levels based on agreement with the customer and the amount that was pre-billed. However, again the '968 patent uses a fixed AMU, which limits how the system can account for dynamic changes in uses at a particular facility or dynamic changes in energy costs.

While these previous systems discussed above provide significant advantages over prior art systems, they do not account the dynamic nature of businesses where operations and business flow can change dramatically in a short period of time.

In addition, it has been observed that facilities using the same or virtually identical equipment for a similar application may vary markedly in total energy usage. Looking deeper into the setup and operation of a facility has brought to light many variables that can have a material impact on energy usage and as such, on the total costs associated with running the facility.

Many variables can impact the cost of operation of two different customers with similar businesses in the same climate zone, but who see very different operational costs based on different energy usages. These variables may include different business volumes, different hours of operation, different utilization of the facility, different business operational flows, and other different operational considerations.

Even when comparing energy costs for a single facility from one billing period to the next, or from one year to the next, dramatic changes in energy usage can occur. The business may see its business volume change over time, or the business may implement new processes that impact energy usage rendering previous energy usage predictions obsolete.

It has been further observed that even the relatively simple act of moving the location of equipment in a facility or changing the layout of business process flow in a facility can have an impact on energy usage. As such, the concept of a one-size-fits-all methodology is not sufficient to accurately predict energy usage for a particular facility, even when the energy usage data for a similar facility with similar equipment in the same climate zone is known.

Therefore, a need exists for a dynamic and variable method to calculate an AMU for companies that are estimating energy usage for a facility and/or prebilling for such estimated energy usage. The method should be able to dynamically adjust and adapt to changing conditions at the facility taking into consideration a variety of real-world issues impacting actual energy usage at the facility.

SUMMARY OF THE INVENTION

Accordingly, it is desired to provide a system and method that can create a calculated average monthly energy usage, which adapts to dynamically changing environmental, business, operational, and equipment-related conditions at a facility.

It is also desired to provide a system and method that can dynamically gather energy usage data from equipment measurement devices that accounts for the age and type of the equipment being deployed and which data is used to dynamically adjust a calculated average monthly energy usage of a facility.

It is further desired to provide a system and method that can gather external data from environmental sensors and data feeds including but not limited to temperature, humidity, airflow, occupancy, sunlight, and so on and which data is used to dynamically adjust a calculated average monthly energy usage of a facility.

It is still further desired to provide a system and method that can capture and pull data from data feeds from third-party systems to gather data on weather, traffic, local attractions, and events and which data is used to dynamically adjust a calculated average monthly energy usage of a facility.

It is yet further desired to provide a system and method that can capture and pull data from operational systems such as business operating hours, human resources and staffing information, holiday schedules, menu changes, customer order information and patterns, business volume and the like and which data is used to dynamically adjust a calculated average monthly energy usage of a facility.

Finally, it is desired to provide a system and method that employs machine learning in connection with multitude inputs from equipment measurement devices, environmental sensors, third-party systems, external feeds, and operational systems to recognize dynamically changing conditions and automatically build correlations of these changes with the energy used at the facility.

It is an object of the present disclosure to gather diverse data relating to a facility and that can have an impact on the average monthly energy usage of the facility, where this data is analyzed, and predictive models are generated to better predict average monthly energy usage in subsequent months.

In one configuration, a computer having software executing thereon is provided where the software comprises data collection modules that gather data fed into a database that is accessible by an analytic module. In one embodiment, this data is saved into a table of data.

The database or the table may be provided with locations for saving environmental data such as, temperature data and weather forecasts. This database or table may further be provided with locations for saving news and local events that may have an impact on the functioning of the facility.

It is further contemplated that the database or table may be provided with location for saving equipment data. This equipment data may include information identifying the equipment along with specifications of the equipment. This data may include an expected energy usage curve for the equipment based on data collected from identical or similar equipment. The data may further include an anticipated equipment degradation curve to account for changes in the operation and energy usage of the equipment over time. All of this may form a complex equipment knowledge base for the equipment installed at a facility.

It should be recognized however, that equipment efficiency can be very different from one installation to another. As such, the system will monitor and save historical energy usage data for each piece of equipment running at the facility and these can be compared to expected energy usage curves to provide a better predicted energy usage model for future installations in similar installations. Additionally, this data can be used for benchmarking purposes.

Initially, the system begins by calculating an overall AMU based on a predicted energy usage calculated from the facility profile and upgraded equipment deployed in the facility. This initial overall AMU can be calculated and generated as taught in the '690 patent based on the profiles of equipment being used.

The system then measures an actual energy usage and determines how well the actual energy usage compares to the expected AMU based on the actual usage in view of the data received from various sources (e.g., environmental sensors, third-party systems, and operational systems). If the actual usage ended up being higher or lower than the predicted energy usage, the data from the various sources are noted, and correlation data generated to adjust for a subsequent monthly estimation. As this calculation takes many sources of data into consideration, machine learning is used to assign weights to the variables to dynamically fine tune the estimation. The result is a more accurate estimation rather than a static AMU for a full energy billing period.

In one example, the system may apply a weighting to the length of time an oven is being used to offset the HVAC system. The weighting may be assigned by the system as a starting point by default. However, as the energy use is monitored and correlating HVAC use and oven use, the system may determine that the oven use has a larger impact to the overall heating of the space than was initially anticipated. This could be due to several reasons such as, the temperature sensor may be located near the oven, which is having a direct impact on the temperature readings; or it may be due to relatively poor insulation around the oven such that the oven is radiating a relatively large amount of heat; or it could be due to frequent door openings of the oven; or a combination of reasons. In any event, the data is saved into the database or table and a weighting is increased in the correlation module. The purpose is so that predictions of energy usage based on subsequent periods of oven use will better correlate with actual energy use. This in turn will allow the system to better predict HVAC usage in the facility (i.e., be that less heat required in the winter, or more air conditioning required in the summer based on the amount of oven use).

It should also be understood that oven use is tied to business volume. For example, a Quick Serve Restaurant (QSR) may have to run through several bread baking cycles to provide enough bread for the daily sales volume. This, in turn, may be tied to the menu and customer ordering habits at the location where a large percentage of customers order sandwiches or meals that include bread. The correlation of historical business volume and menu selections can be used as a basis to estimate energy use. For example, it is understood that a restaurant may order supplies based on a prediction of customer orders, which orders are designed to minimize food waste. In cases where inventory has a direct correlation to menu selection, these energy usage predictions can be correlated to inventory ordering.

Additional factors that are correlated to the energy use include equipment status, maintenance, and the age of the equipment as well as the location of the equipment in the facility. As equipment ages, the efficiency of the equipment will degrade. Typically, a piece of equipment will have an expected lifespan (expressed in hours of operation) and the operational efficiency of the equipment can be predicted at points along the lifespan. For example, it could be that a certain piece of HVAC equipment newly installed may initially be expected to pull "X" amps at the operation voltage and provide "Y" BTUs during operation. However, as the HVAC equipment ages, the equipment may begin to pull "X+A" amps while at the same time provide "Y−B" BTUs. By continually monitoring and comparing the overall energy use of certain equipment over its lifespan, equipment efficiency curves can be established, which are used to predict future the degradation. Eventually equipment operation will degrade to a point that it is decided that upgrading/replacing the equipment is appropriate. At such time, the system may adapt with the knowledge of the new equipment and age using new efficiency curves applicable to the newly installed equipment.

It should also be understood that environmental data can be used for calculating AMU as discussed in the '690 patent. In additional to using climate zone and typical seasonal variance data, the real time AMU system uses weather forecasts to adapt to unseasonable cold or warm weather. If temperature predictions show a warmer than average summer in the region where the facility is located, more HVAC usage will be estimated in the dynamic AMU calculation.

Other operational factors may also come into play that may be detected automatically by the machine learning and predictive learning capabilities of the dynamic AMU system. For example, in a food service establishment, if the door of the refrigerator is kept open while it is being filled, the system will "learn" the process and attribute energy use of the refrigerator and freezer compressors based on the typical operation of the business. Business volume also plays a role in these determinations. For example, the refrigerator may open more often corresponding to increased food preparation and based on the need to load more food supplies. All these processes can be learned by the system.

Likewise, if the company institutes a new procedure such that the door to the refrigerator or freezer is required to be closed in between loads, this may result in the walk-in freezer or refrigerator losing less cold air resulting in a corresponding drop in the use of the condenser. The system will learn this new behavior and adjust the weighting correlating business volume to compressor use.

There are several situations where this type of process adjustment could have significant impact on equipment use and therefore energy consumption. For example, it could be that when food supplies are delivered to a location, the back door to the facility may be propped open. On hot summer day, this can have a significant impact on the HVAC equipment endeavoring to maintain the temperature in the space. Again, as the system learns how the equipment runs, weighting can be adjusted and changed when new processes are implemented. In this way, the system is dynamic in predicting how the running of equipment will impact future energy consumption even during changing business conditions.

Other examples may involve the way food is cooked at the location. It could be the shop prepared meals as they were ordered (e.g., the stove top or grill may be operational during the time it takes to cook each order.) However, a change in the business process may entail pre-cooking several meals at the same time with an expectation that orders for these meals will be received based on historical information. In this situation, this may mean that less heat is generated overall because the stove top or grill is operated for a shorter time and more efficiently. It could be the more meals may be served in a shorter time, however, the energy use may not reflect the increased volume, but instead, could drop based on proper planning of the business operation.

Still further, it is contemplated that various data feeds can be provided to the system to estimate ordering and business volume. For example, weather information can be used to formulate a correlation between an amount of ice-cream sold on a very hot day or hot soups sold on a cold day. The energy that is used in the preparation of these items can be estimated and based on the weather data received, a weighting can be applied in the calculation of projected energy consumption.

The above is just some of the various factors and data than can be used by the A.I. to prepare an energy estimate calculation for energy use for the coming billing period. However, other factors such as localized construction, traffic or snow/ice on the roads could function to limit the in-person volume of traffic at a location. Likewise, an event such as a concert in a local area, a festival, or a local office complex hosting a hiring expo may increase foot traffic. All these data inputs can be used by the A.I. to adjust the weighting of criteria to predict future energy consumption more accurately.

While related to the above, access to data from the restaurants HR system including operating hours, staffing, and inventory ordering can serve as additional data inputs to support estimated AMU calculations. For example, if a meal item (e.g., a hot sandwich) has a higher energy cost to create relative to other meal items, the system could predict that more of these sandwiches will be sold on a cold day based on current weather and historical data. It will be understood that the hiring additional staff or extending operating hours during certain times of the year can be used to estimate extended equipment use, and corresponding energy use.

These examples are provided to illustrate just some of the variations in business processes the system could receive input data on and should not be taken to be limiting. Likewise, the weighting of the various inputs can change based on the receipt of dynamically changing data.

In still another example with a restaurant menu, as new items are added, the popularity of the items and the preparation profile (toasting, warming, baking etc.) can be used to predict future energy usage. In this example, the system can account for energy use of the equipment being directly used to prepare the new menu items. As these menu items are ordered and prepared, the direct energy use to prepare them along with indirect knock-on effects to other systems (e.g., increase in stove use leads to increase heat generation in the space, which leads to increased workload for the HVAC system during hot summer months) can be accounted for and the system can weight these new menu items into the calculation of predicted energy use. In one configuration, an energy use calculation could be done by the A.I. on a per menu item where it is known that a given item requires a certain amount of energy to produce. In such a situation, it could be decided that the price for such items should be adjusted based on the energy needed to produce the item. This becomes even more apparent as inflation and energy costs continue to steeply rise.

In another configuration it is contemplated that a table of variables may be generated, and a continual improvement process of: estimation, adjustment and re-estimation will continue with a growing set of variables as data is gathered and saved through new integrations, sensors, and data points. As the analysis and correlation of the variables continues to improve, the estimation accuracy the system relating to predicted energy use will correspondingly increase.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one configuration, a system for predicting and managing energy usage at a facility is provided, the system comprising a computer having a storage, the computer coupled to a network, software executing on the computer comprising artificial intelligence calculating a predicted future energy use of the facility, and the software calculating an Average Monthly Usage (AMU) based on facility profile data and equipment data associated with at least one piece of equipment at the facility. The system further comprises at least one sensor measuring the operation of the at least one piece of equipment at the facility, the at least one sensor transmitting equipment operation data to the computer via the network, an environmental data input coupled to the computer, the environmental data reflective of environmental conditions outside of the facility, and the software comparing the equipment operation data to the environmental data to determine correlation data. The system is provided such that the software compares the equipment operation data to the calculated AMU to determine variance data, the software modifies the AMU to generate a modified AMU based on the correlation data and the variance data, and the software performing an action when the variance data exceeds a threshold value, wherein the action is selected from the group consisting of: cycling of the equipment, modifying the operation of the equipment, generating an alarm, turning the equipment off, running the equipment through a diagnostic, and combinations thereof.

In another configuration, a method for predicting and managing energy usage at a facility with a computer having a storage and coupled to a network is provided, the method comprising the steps of: software executing on said computer comprising artificial intelligence calculating a predicted future energy use of the facility, and the software calculating an Average Monthly Usage (AMU) based on facility profile data and equipment data associated with at least one piece of equipment at the facility. The method further comprises the steps of measuring the operation of the at least one piece of equipment at the facility with at least one sensor, transmitting equipment operation data measured by the at least one sensor to the computer via said network, and receiving an environmental data input at the computer, the environmental data reflective of environmental conditions outside of the facility. The method further comprises the steps of the software comparing the equipment operation data to the environmental data to determine correlation data, and the software comparing the equipment operation data to the calculated AMU to determine variance data. Finally, the method comprises the steps of the software modifying the AMU to generate a modified AMU based on the correlation data and the variance data, and the software performing an action when the variance data exceeds a threshold value, wherein the action is selected from the group consisting of: cycling of the equipment, modifying the operation of the equipment, generating an alarm, turning the equipment off, running the equipment through a diagnostic, and combinations thereof.

Other objects of the disclosure and its features and advantages will become more apparent from consideration of the following drawings and accompanying detailed description.

BRIEF DESCRIPTION OF THE DRAWINGS

FIG. 4 is an illustration of a table of information used by the system of FIG. 1.

DETAILED DESCRIPTION OF THE INVENTION

Figure 1:
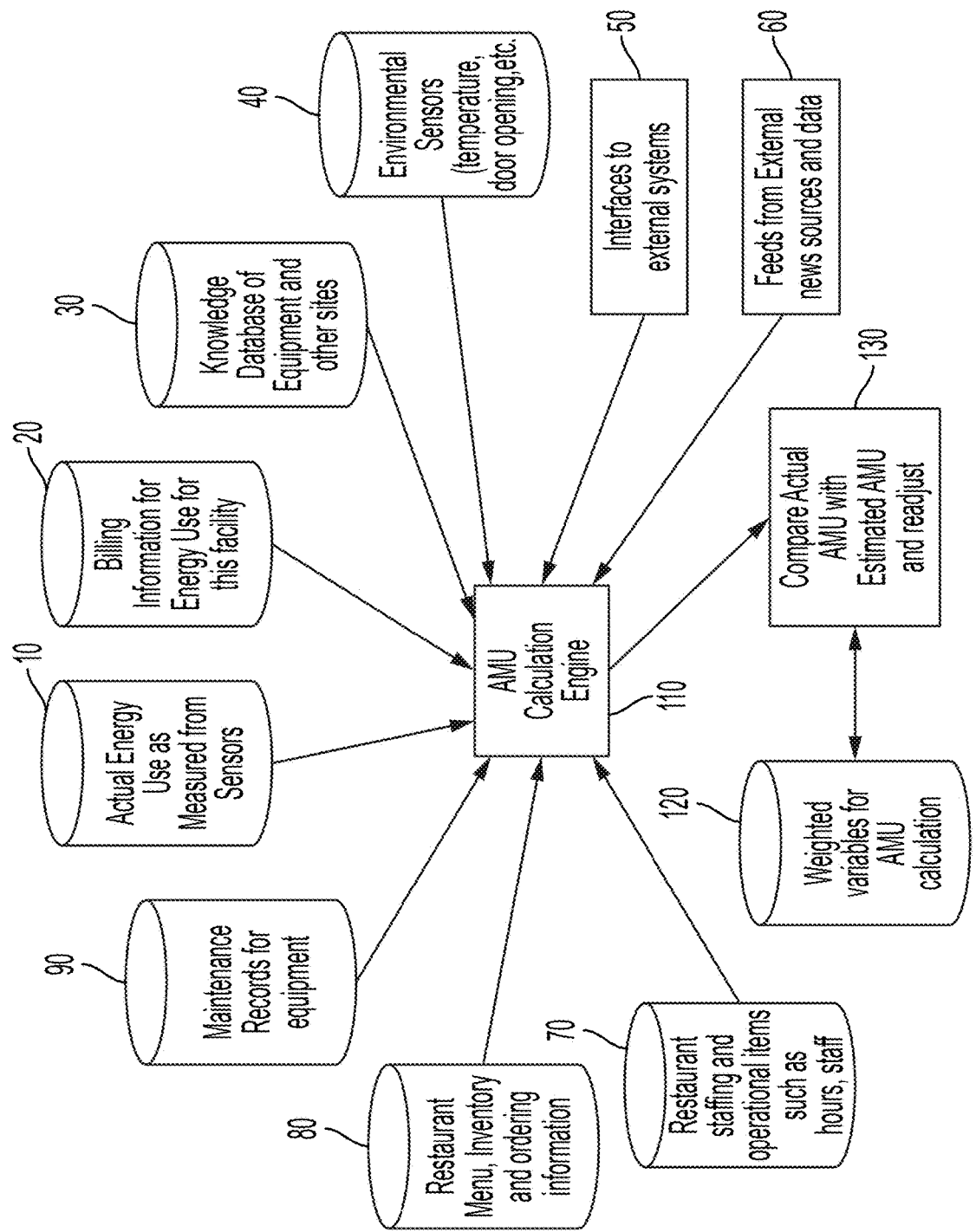
FIG. 1 is a block diagram of the system for predicting and managing energy usage at a facility with the various components shown as a context diagram for the dynamic AMU calculation engine.

Referring now to the drawings, wherein like reference numerals designate corresponding structure throughout the views.

FIG. 1 is an example energy management system illustrated with various components.

Actual energy use (10) as measured by various sensors deployed at the facility is gathered by the AMU engine (110) and used to calculate the actual AMU assigning default weights (120) to the equipment with known variables.

Billing information (20) is used to validate the actual AMU with the estimated AMU (130) which is the used to fine-tune the weights used (120) to estimate subsequent AMUs. Additional variables such as known equipment types in a knowledge base (30) are used along with maintenance and age information (90) to predict energy use of this equipment in the AMU calculation (130).

Other external factors including environmental sensors (40) such as actual temperature, door openings, humidity are read and used to calculate the AMU (130). Interfaces with external systems (50) can include alarm systems for access, window openings or motion.

Feeds from news sources (60) are used to predict local events and attractions or traffic that may impact business volume. Further systems (e.g., for restaurants) such as staffing and operational hours (70) and even menu and inventory (80) may be used to calculate energy use of equipment used to heat/cool the restaurant and prepare the food when estimating AMU (130).

Once the variables are read (10-90) and weights assigned (120), the AMU calculation engine (110) continues to adjust (130) the weights (120) as it reads actual energy use and compares it to expected use.

There is never a 100% accurate prediction for an upcoming month, but over time the estimates become more accurate as weights are properly adjusted to account for the variables. Companies using energy prediction to calculate AMUs and charge their customers accordingly will benefit from improved margins due to the improved estimates.

Figure 2:
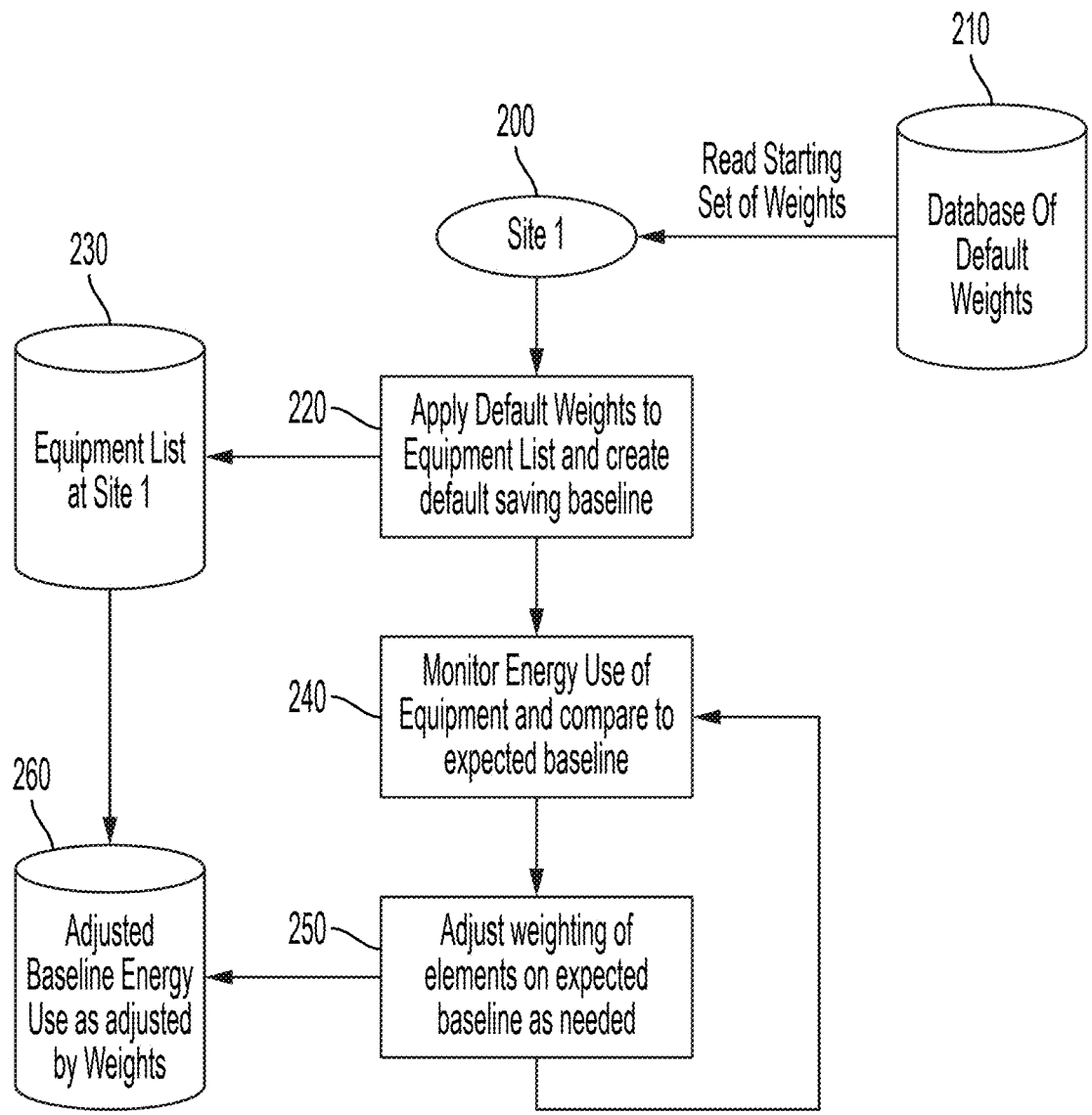
FIG. 2 is a flow diagram of an adjustment to a facilities baseline AMU through monitoring adjustment according to the system of FIG. 1.

Referring to FIG. 2, the adjustment of a facilities baseline energy estimate is illustrated through monitoring and fine-tuning the results.

A given facility (e.g., site 1) (200) reads the starting set of weights from the master database (210) as it starts to monitor and applies (220) these values to its specific equipment list (230). The system monitors (240) the energy use of the equipment and compares the actual usage against the expected baseline. The system then adjusts (250) the weighting from the default (210) weights in its own table (260) of adjusted baseline energy usage. This is repeated and functions to fine tune the system as it monitors energy usage for site 1.

Figure 3:
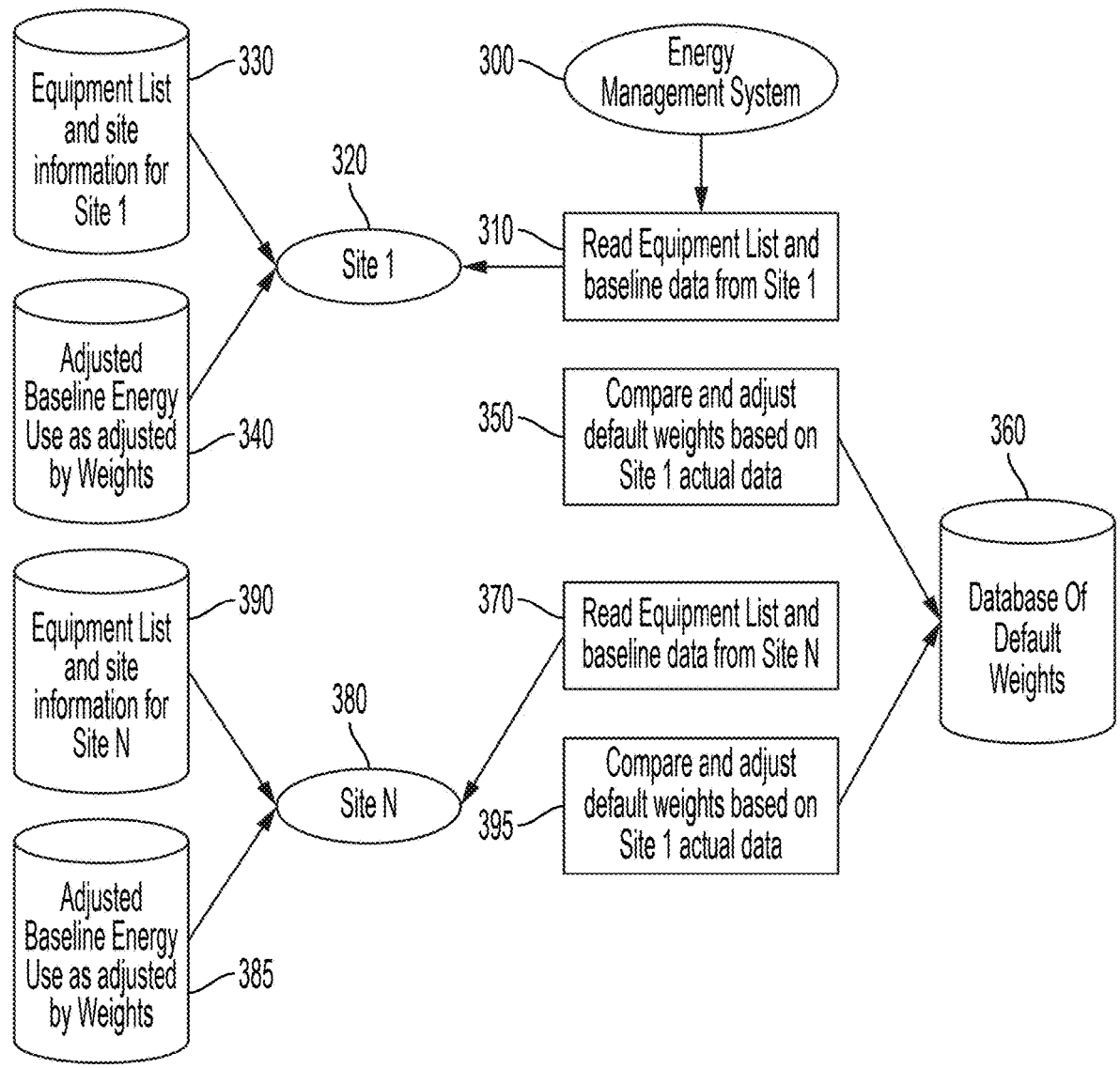
FIG. 3 is a block diagram of the adjustment of the database of information of weights given to various data inputs based on monitoring of a facility according to the system of FIG. 1.

Referring to FIG. 3, the adjustment of the master default database based on what is learned from multiple sites being monitored is illustrated.

The energy management system (300) reads (310) the equipment list (330) and the adjusted baseline values (340) from site 1 (320) gathering the equipment and site information (330) and analyzing how the baselines have changed over time for the equipment. The energy management system (300) then compares the values read with the master database values and adjusts weights based on site 1's actual usage data.

When site 1 is in an identified geographic zone, the baseline may also now be adjusted for other sites that are located in the same geographic zone. In effect, the historical information from site 1 may be used as a starting point for new sites that are also located in the same geographic zone. The intention of the master set of weights is such that the initial estimates for energy savings at a given site will be the most accurate. While the individual sites continue to learn and fine tune their own values, this further information can be used for still additional new sites in the same geographic zone.

FIG. 3 also shows how the energy management system (300) similarly reads (370) the equipment list from site N gathering the site N information (390, 385) and compares and adjusts (395) the weights in the database (360) for other sites.

FIG. 4 shows a sample set of tables for site 1 (400) listing the equipment (410) available on the site, information (430) about the site, along with the external variables, which have an expected and actual impact to energy use. The table (420) is dynamically adjusted as the usage is monitored over time.

In the equipment list table (410) the type of equipment, the age of the equipment, and the model numbers are kept. Additional details about the service record are also stored and dynamically updated based on the monitored operation of the equipment. The expected usage for the given facility is listed along with the actual usage. A large delta in actual usage may trigger alerts as well as automatic adjustment from the facilities controller. In most cases, small discrepancies are attributed to the impact of external variables (420) which are used to fine tune and improve estimates on the site.

Additionally, site information (430) is stored which helps classify the site for comparison with other similar sites when adjusting the master baselines and weights.

For example, a facility with four exposed walls, an HVAC unit on the roof in a cold climate zone will have a different set of weights for the impact of the outside temperature to the HVAC equipment operation than a facility which is completely enclosed inside a shopping center with no exterior walls.

Figure 5:
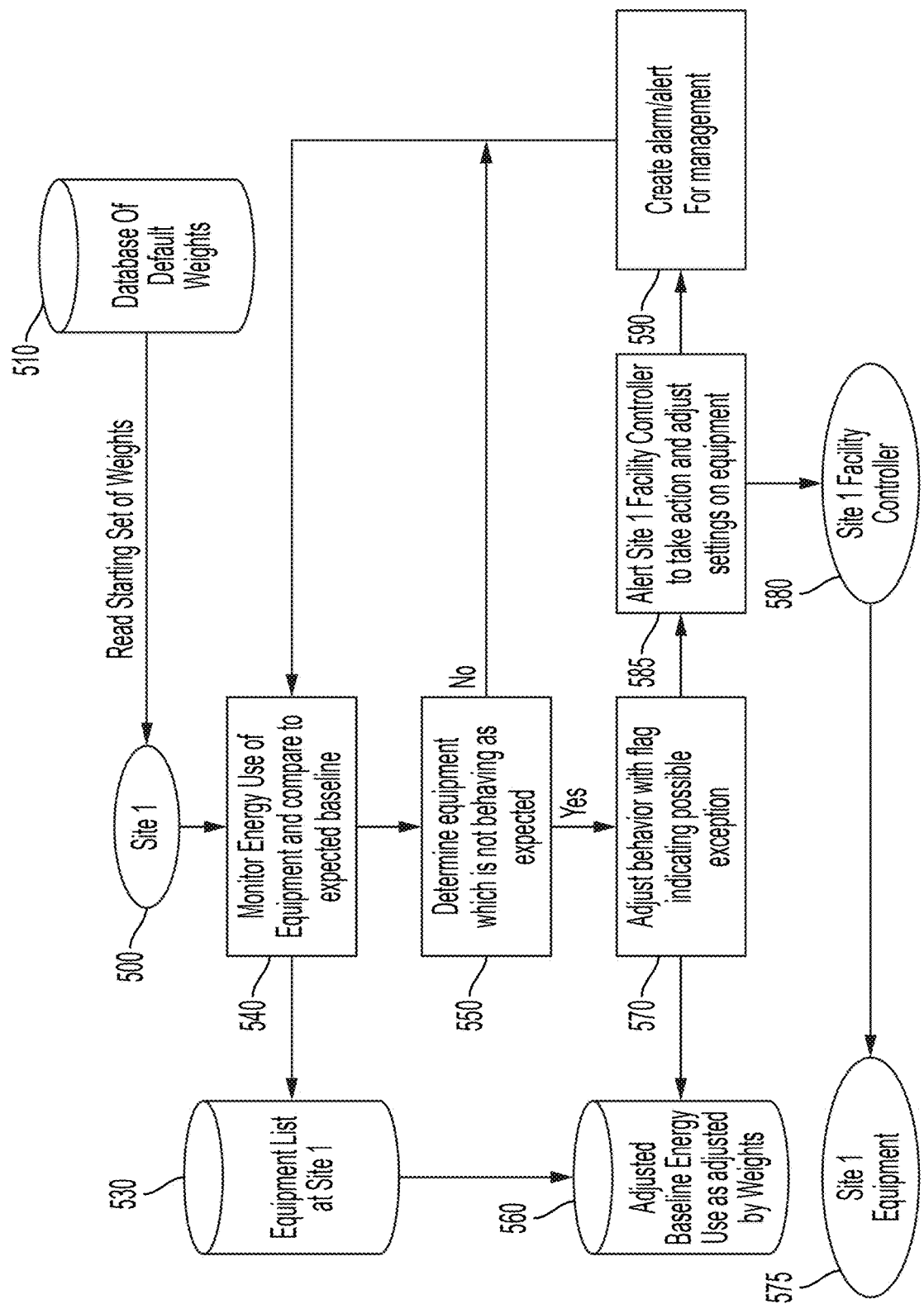
FIG. 5 is a flow diagram illustrating monitoring and automatic adjustment of equipment and alerting according to the system of FIG. 1.

FIG. 5 illustrates how the energy monitoring for site 1 (500) can trigger actions from the site's facility controller (580) that can automatically adjust equipment (575) at site 1 or trigger alarms (590) for technician dispatch or owner alerting.

When site 1 (500) monitors (540) the equipment (530) and compares this to the expected baseline (560), which has been adjusted over time, it is possible that anomalies are detected (570) causing such actions to take place. These actions can include cycling of the equipment, modifying the operation of the equipment, generating an alarm, turning the equipment off, running the equipment through a diagnostic, and combinations thereof.

If no anomalies are present, the system simply continues to monitor and adjust the baseline to improve on the energy estimates. In time, the AI will learn the particulars about the facility and equipment to provide for a more accurate energy usage prediction. Additionally, the A.I. will learn the operation of the facility that will account for the number of employees, the volume of customer traffic, the manner in which the equipment is used at the facility, the frequency of use, the hours of operation, and a host of other information that can impact the energy use of the facility. The knowledge database will continue to grow over time allowing the system to provide more and more accurate predictions. The system will also be able to adapt to changes in the operation of the facilities and self-correct for changes in personnel, changes in equipment, changes in business volume, changes in business and customer flow. The automated nature of the system means that the owner need not be closely involved with the monitoring of the equipment and day to day operation of the facility to achieve the best energy usage prediction possible.

Based on the accurate energy prediction, changes in how the facility is utilized can be implemented to reduce energy consumption. For example, is could be noticed that site 1 uses a certain amount of energy for operation and site 2 uses more energy than site 1. The system can account for structural, business flow and other differences. However, if the prediction is consistently much higher energy use for site 1 than site 2 and the additional energy use cannot be explained by increased sales or business volume or facility configuration, then an alarm or message may be generated and transmitted detailing the excess energy usage. The owner may then be alerted to the issue that an investigation into the facility is warranted. It could be that an adjustment to the operation of site 1 could result in lowering the energy usage through the adjustment of business operations. For example, it could be that in loading food items into a freezer or refrigerator at site 1, employees prop the back door open and the freezer door open. During hot summer months this can make the HVAC equipment and the freezer work harder to compensate for the activity. It could be that seals around the freezer door have become damaged and need replacement. It could be that batch cooking could be implemented that would reduce the heat generation in the facility, and so on.

Figure 6:
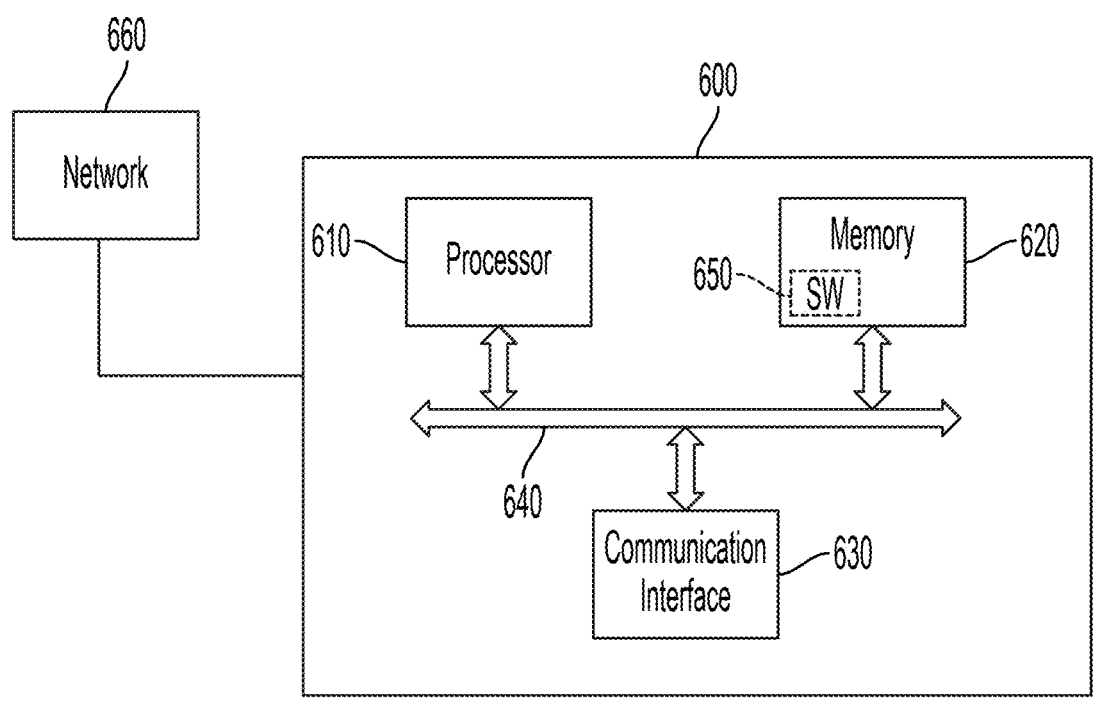
FIG. 6 is a computing device according to example embodiments.

A computer in accordance with example embodiments is illustrated in FIG. 6. Computer 600 includes, but is not limited to, a processor 610, a memory/storage 620, a communication interface 630 and a system bus 640 for interconnecting these components in a known manner. Computer 600 can be a general-purpose computing device. A processor or memory can also refer to a plurality of processors or memory devices.

Computing device 600 enables the functionality described above with respect to FIGS. 1-4 and 6. Computer 600 includes software 650 (stored in memory 620 for example) executed by processor 610. The software comprises artificial intelligence for performing the various functions such as comparisons, calculations, adjustments and assignments for example. Data may be stored in memory 620 for example. Communication with other entities such as sensors (over a network for example) may be facilitated by the communication interface 630. Computing device 600 can be coupled/connected to a network 660.

One of skill in the art will see that there are many different considerations that can be addressed in trying to reduce the energy use in a facility or a Quick Serve Restaurant (QSR). However, accurate information that the energy usage is above an expected value is needed to indicate that a adjustments may be needed. Likewise, while a facility may be functioning in an optimal manner when first set up, it could be that equipment may become damaged (e.g., a cart impacts the seal around the door of a freezer) that reduces the efficiency of the equipment. Rather than paying for the increased energy usage month after month because no reliable measurement and prediction of energy use is available, the present system will be able to identify these types of anomalies and automatically perform and action in response to the monitoring.

Although example embodiments have been described with reference to a particular arrangement of parts, features, and the like, these are not intended to exhaust all possible arrangements or features, and indeed many other modifications and variations will be ascertainable to those of skill in the art.

What is claimed is:

1. A system for predicting and managing energy usage at a facility comprising:
   a computer having a storage, said computer coupled to a network;
   software executing on said computer comprising artificial intelligence calculating a predicted future energy use of the facility;
   said software calculating an Average Monthly Usage (AMU) based on facility profile data and equipment data associated with at least one piece of equipment at the facility in order to determine the predicted future energy use of the facility based on default weights correlated to the facility profile data and equipment data which default weights are determined from multiple facilities;
   said software modifying the AMU dynamically to thereby dynamically adjust the predicted future energy use of the facility based on equipment operation data and environmental data;
   at least one sensor measuring the operation of the at least one piece of equipment at the facility to determine the equipment operation data, said at least one sensor transmitting the equipment operation data to said computer via said network;
   an environmental data input coupled to said computer such that said computer is configured to receive the environmental data, the environmental data reflective of environmental conditions outside of the facility;
   said software comparing the equipment operation data to the environmental data to determine correlation data for correlating the environmental data to the calculated AMU in order to determine a subsequent monthly estimation;
   said software comparing the equipment operation data to the calculated AMU to determine variance data;
   said software modifying the AMU dynamically to generate a modified AMU based on the correlation data and the variance data to thereby modify the predicted future energy use of the facility after the initial calculation of the AMU and the software modifies the default weights based on the correlation data and the variance data; and
   said software performing an action when the variance data exceeds a threshold value, wherein the action is selected from the group consisting of: cycling of the equipment, modifying the operation of the equipment, generating an alarm, turning the equipment off, running the equipment through a diagnostic, and combinations thereof.

2. The system according to claim 1 wherein the equipment data includes information reflecting the type of equipment, the maintenance record of the equipment, and the age or runtime of the equipment.

3. The system according to claim 2 further comprising a table of data, wherein the facility profile data and equipment data is entered into a table of data, said equipment data updated dynamically in the table.

4. The system according to claim 3 wherein said software calculates an expected energy usage curve for the equipment based on the equipment data.

5. The system according to claim 4 wherein the comparing the equipment operation data to the calculated AMU to determine variance data further comprises comparing the equipment operation data to the expected energy usage curve.

6. The system according to claim 2 wherein the environmental data is selected from the group consisting of: temperature, humidity, wind, sunlight index and combinations thereof.

7. The system according to claim 6 wherein the environmental data is entered into the table of data, said environmental data updated dynamically in the table.

8. The system according to claim 6 further comprising a plurality of additional data inputs connected to said computer, said plurality of additional data inputs selected from the group consisting of:
   event data, facility time operation data, facility utilization data, human resources data, staffing data, menu information, customer order information, and combinations thereof;
   wherein said software compares the equipment operation data to at least one of the additional data inputs to adjust the correlation data.

9. The system according to claim 8 wherein the event data comprises information about events in the vicinity of the facility that will impact the operation of the facility, including events that would impact pedestrian traffic in or around the facility.

10. The system according to claim 8 wherein the facility time operation data comprises information relating to the hours of operation for the facility.

11. The system according to claim 8 wherein the facility utilization data comprises information relating to the location of equipment in the facility, the timing of the operation of the equipment in the facility, and combinations thereof.

12. The system according to claim 8 wherein said software applies to a weighting to the equipment data, the environmental data, and to at least one of the additional data inputs.

13. The system according to claim 8 wherein the plurality of additional data inputs is entered into the table of data, said plurality of additional data inputs updated dynamically in the table.

14. The system according to claim 13 wherein the equipment data, the environmental data, and the additional data inputs are normalized with normalization data in the table.

15. The system according to claim 14 wherein the equipment data comprises an anticipated equipment degradation curve associated with the at least one piece of equipment to account for changes in the operation and energy usage of the at least one piece of equipment over time.

16. The system according to claim 13 wherein,
   said at least one piece of equipment comprises a plurality of equipment located at the facility, each of the plurality of equipment having expected equipment operation data; and
   a plurality of sensors associated with the plurality of equipment, each sensor transmitting respective equipment data to said computer.

17. The system according to claim 16 wherein the respective equipment data is entered into the table, said software comparing the respective equipment operation data to the calculated AMU to calculate the variance data.

18. The system according to claim 13 wherein the table of data comprises a single table of information that is referenced by said software.

19. A method for predicting and managing energy usage at a facility with a computer having a storage and coupled to a network, the method comprising the steps of:

software executing on said computer comprising artificial intelligence calculating a predicted future energy use of the facility;

the software calculating an Average Monthly Usage (AMU) based on facility profile data and equipment data associated with at least one piece of equipment at the facility in order to determine the predicted future energy use of the facility based on default weights correlated to the facility profile data and equipment data which default weights are determined from multiple facilities, said software modifying the AMU dynamically to thereby dynamically adjust the predicted future energy use of the facility based on equipment operation data and environmental data;

measuring the operation of the at least one piece of equipment at the facility with at least one sensor to determine the equipment operation data;

transmitting the equipment operation data measured by the at least one sensor to the computer via said network;

receiving an environmental data input at the computer, the environmental data reflective of environmental conditions outside of the facility;

the software comparing the equipment operation data to the environmental data to determine correlation data for correlating the environmental data to the calculated AMU in order to determine a subsequent monthly estimation;

the software comparing the equipment operation data to the calculated AMU to determine variance data;

the software modifying the AMU dynamically to generate a modified AMU based on the correlation data and the variance data to thereby modify the predicted future energy use of the facility after the initial calculation of the AMU and the software modifies the default weights based on the correlation data and the variance data; and the software performing an action in response to the variance data exceeding a threshold value, wherein the action is selected from the group consisting of: cycling of the equipment, modifying the operation of the equipment, generating an alarm, turning the equipment off, running the equipment through a diagnostic, and combinations thereof.

* * * * *